3,359,117
REMOVAL OF STRONTIUM 90 FROM MILK WITH CALCIUM PYROPHOSPHATE, STRONTIUM PYROPHOSPHATE, OR MIXTURE THEREOF
Bartholomeus Van't Riet, Richmond, Va., assignor to the United States of America as represented by the United States Atomic Energy Commission
No Drawing. Filed Dec. 23, 1966, Ser. No. 604,493
8 Claims. (Cl. 99—60)

ABSTRACT OF THE DISCLOSURE

A process for the removal of radioactive strontium from milk by contacting the milk with an inorganic salt of either strontium pyrophosphate, calcium pyrophosphate or a mixture thereof, said inorganic salt being attached to a silica-alumina porous support, thereby removing radioactive strontium from the milk.

---

This invention was made in the course of, or under contract with the United States Atomic Energy Commission.

*Background of the invention*

This invention relates to the treatment of foods and beverages. More particularly, it relates to the purification of milk. Still more particularly, it relates to the purification of milk by removing radioactive contaminants therefrom. And still more particularly, it relates to the purification of milk by removing radioactive strontium 90 therefrom.

Homogenized, pasteurized and refrigerated milk was once considered an eminently safe beverage. This consideration has changed drastically as nuclear testing began. Radioactive fallout contaminants in most edibles immediately became apparent. And even though nuclear testing is now on the wane due to an above ground nuclear test ban by most possessors; nevertheless, some testing is still being done and should a holocaust occur, readily available methods to purify remaining edibles must be available to survivors.

Many contaminants are introduced into edibles through nuclear testing. Some include iodine-131, cesium-137, strontium-89 and strontium-90. The latter is one of the more dangerous to man as it becomes fixed in the skeleton, where the replacement rate of body cells is quite low. Namely, only half of any intake is gone after ten years.

The removal of strontium-90 from milk has been the subject of many investigators in an effort to solve the problem efficiently and economically. The use of ion-exchange resins to selectively remove the strontium from milk was one of the first successful processes. This process, however, requires elaborate processing equipment and instrumentation as well as extremely efficient filtration systems to prevent harmful impurities such as bits and pieces from the resin bed from getting into the decontaminated milk. The use of calcium carbonate and/or calcium phosphate to remove radioactive strontium from milk by passing the milk through an agitated bed of the calcium carbonate or calcium phosphate at a temperature of from 60° C. to about 80° C., has also been shown. Drastic changes occur in the composition of milk when removal of more than 50% of strontium-90 is made by this process with consequent unpalatable taste and therefore less consumption by the populace.

It is, therefore, an object of this invention to provide a process for the selective removal of strontium-90 from milk which will enable every person to easily decontaminate any milk at home that may be suspect prior to drinking it.

Another object of this invention is to provide a process for the selective removal of strontium-90 from milk in which the flavor and physical characteristics of the milk remain essentially the same.

A further object of this invention is to provide a process for the selective removal of strontium-90 from milk which is inexpensive and simple enough for the average user to utilize without any difficulty.

A still further object of this invention is to provide a process for the selective removal of strontium-90 from milk in which the removal is highly successful at the normal refrigerated storage temperature.

Other objects will become apparent in the course of the following description and the appended claims.

These objects are accomplished by contacting radioactive strontium contaminated milk with an inorganic salt selected from the group consisting of strontium pyrophosphate and calcium pyrophosphate and mixtures thereof wherein said inorganic salts are attached to a silica-alumina porous support, thereby removing said radioactive strontium from the milk.

This invention utilizes the principle of so-called isotopic exchange. A simple isotopic exchange reaction may be defined as:

A reaction in which the atoms of a given element exchange between two or more chemical or physical forms of the element.

The progress of the reaction can be followed when a radioactive isotope is introduced as a tracer in one of the forms of the element.

The isotopic exchange of this invention occurs between two physical forms of the elements strontium or calcium or a mixture thereof on silica-alumina porous supports. The initial exchange between the reactant on the surface of the solid and the reactant in the liquid occurs rapidly and represents the first part of the isotopic process. The second part of the isotopic process goes much slower and represents diffusion of the reactant into the interior of the solid. This slowing down of the process also represents the approaching of an equilibrium value.

Milk is a colloidal system composed of several phases varying in their degree of dispersion. The following breakdown gives the composition of an average normal cow's milk:

| | Percent |
|---|---|
| Water | 87.0 |
| Fat | 4.0 |
| Casein | 3.0 |
| Albumin | .5 |
| Milk sugar | 4.8 |
| Ash | .7 |
| Total | 100.0 |

The calcium and strontium are intimately tied up as complexes in these various phases. Though authors differ as to how and where these elements are, it is known that the calcium and phosphorus contents of milk decrease during the heating of milk which shows that some of the calcium occurs as phosphate. Other amounts of calcium are found in the complex casein in the form of innumerable particles of calcium caseinate which vary considerably in size.

The calcium and strontium pyrophosphates are used as they exhibit good extraction of the radioactive strontium- 90, low solubility and are non-toxic, and, while not natural occurring components of milk, are metabolized by the body to orthophosphates which are natural occurring food components.

The use of a silica-alumina ($SiO_2$-$Al_2O_3$) porous for the calcium and/or strontium pyrophosphate or mixture thereof is preferred in the operation of the process. And, though other supports were evaluated, such as, activated alumina, alumina catalyst pellets, activated charcoal, ceramic firebrick and pumice; none gives as good a percent removal rate of strontium-90 from milk at the preferred temperature of 25° C. and with continuous circulation of the milk without other deleterious effects to the milk as the silica-alumina porous support. The ratio of silica to alumina in the porous support may vary; however, maintaining substantially it stoichiometrically is preferred.

Both microspheres and pellets of silica-alumina were investigated and evaluated. While the microspheres yield the greater surface area and consequently somewhat faster removal rate initially, this initial advantage is of no significant import as the pellets yield equivalent removal within such a short period of time that no significant difference is observable after one hour.

STRONTIUM AND CALCIUM PYROPHOSPHATE SUPPORT PREPARATION

Silica-alumina pellets (total occupied volume 250 ml.) are soaked in 200 ml. of 0.02 M strontium or calcium nitrate in the presence of excess $NH_4OH$, then heated to boiling and then 230 ml. of 0.1 M sodium pyrophosphate is added. The pellets containing absorbed pyrophosphate are dried at 110° C. for one hour and placed in a glass column, height 60 cm., diameter 3 cm. The column now is ready for use in removal of the strontium-90 from milk. Other methods of precipitating the preferred salts onto the preferred support are readily discernable to those skilled in the art.

It is not known exactly as to how and why the silica-alumina supported pyrophosphate salt increases the effectiveness of the radioactive strontium to such a marked extent; however, it is postulated that trapped hydrogen ions exist upon its surface, and therefore are in contact with the strontium salt and milk, thereby tending to cause the casein complexes to be "locally acidified" and thus release the complex bound strontium for exchange. The greater the surface available, the more pronounced the exchange that takes place initially.

An increase in the rate of removal occurs when the temperature is increased. While the process tends to be linear at lower temperatures, at higher temperatures the rate of removal decreases with time. The removal at normal refrigerated temperatures, though linear, is constant and yields a much improved product.

The removal limit can be raised by pH lowering. And, although lowering of the pH tends to increase the solubility of the solid strontium, this control relationship can be utilized to speed up or slow down the process as desired.

The method of contact between the milk and the pyrophosphate on the porous silica-alumina support does not effect the rate of removal. Batch contact, continuous contact with recirculation and one-pass continuous contact—all yield essentially identical results.

The milk-salt ratio is not of any great import. The important factor concerning the milk-salt ratio is the contact time. However, this relationship of milk-salt ratio is extremely broad, that is, the amount of salt to the amount of milk must be minutely small for the necessary contact time to be extended appreciably in effecting the exchange. For example, identical results are obtained in treating 17 liters of contaminated milk with 362.4 grams of strontium pyrophosphate on silica-alumina supports as treating 300 milliliters of contaminated milk with 300.0 grams of strontium pyrophosphate on silica-alumina supports.

The invention will be better understood according to the following examples which are meant to be illustrative and not limitative.

Example I

This example illustrates the contrast between pure unsupported calcium and strontium pyrophosphate salts and such salts supported by silica-alumina supports.

To 50 ml. of strontium-90 contaminated milk at 20° C. is added 1.587 grams of strontium pyrophosphate. The mixture is intimately mixed. After two hours, 94% of the activity remains in the milk. Upon further checking after twenty-four hours, no change in activity was noted. In a similar experiment, 8 weight percent strontium pyrophosphate on a silica-alumina support shows a continuous decrease in activity of the milk. The remaining activity in the milk shows 69% after 1 hour; 50% after 2½ hours; 37.5% after 5 hours; 26% after 10½ hours and 17% after 24 hours.

Example II

To 50 ml. of milk as in Example I at 26° C. is added 8 weight percent calcium pyrophosphate on a silica-alumina support. The remaining activity in the milk shows 69.7% after 1 hour; 57.2% after 2½ hours; 39.0% after 5 hours; 28.5% after 10½ hours and 18.5% after 24 hours. The pH of the milk before the experiment was 6.75. It was 6.05 afterwards.

Example III

To 50 ml. of milk as in Example I at 5° C. is added 8 weight percent strontium pyrophosphate on a silica-alumina support. The remaining activity in the milk shows 83.4% after 1 hour; 69.2% after 2½ hours; 48.5% after 5 hours; 37% after 10½ hours and 27% after 24 hours. The pH of the milk before the experiment was 6.65. It was 6.05 afterwards.

The process of this invention is useful as a purifier of milk in all instances wherein the milk may be suspect of radioactive contamination. The most promising aspect of this process is the fact that the composition of the milk is not changed during the treatment and therefore the normal taste with adequate and proper consumption would more likely be maintained. Such a process is useful as a civil defense home kit.

Many equivalent modifications of the above will be apparent to those skilled in the art without a departure from the inventive concept.

I claim:
1. A process for the removal of radioactive strontium from milk which comprises contacting said milk with an inorganic salt selected from the group consisting of strontium pyrophosphate and calcium pyrophosphate and mixtures thereof, said inorganic salts being absorbed upon silica-alumina porous pellets, thereby removing said radioactive strontium from the milk.
2. A process according to claim 1 wherein the inorganic salt is strontium pyrophosphate.
3. A process according to claim 1 wherein the inorganic salt is calcium pyrophosphate.
4. A method according to claim 1 wherein the inorganic salt is a mixture of strontium and calcium pyrophosphate.
5. A method according to claim 1 wherein the ratio of the silica to aluminum in the porous support is substantially stoichiometric.
6. A process according to claim 1 wherein said milk temperature is maintaned at from about 5° C. to about 30° C.
7. A process according to claim 1 wherein said contact time of the milk with the inorganic salt absorbed upon the silica-alumina porous pellets is at least one hour.
8. A process according to claim 1 wherein the pH of the milk during contact with the inorganic salt absorbed upon the silica-alumina porous pellets is maintained at from 5.2 to 8.0.

References Cited

UNITED STATES PATENTS

| | | | |
|---|---|---|---|
| 3,020,161 | 2/1962 | Murthy et al. | 99—60 X |
| 3,119,702 | 1/1964 | Leviton et al. | 99—60 X |
| 3,148,989 | 9/1964 | Murthy et al. | 99—60 |
| 3,186,849 | 1/1965 | Silverman | 99—54 X |
| 3,194,663 | 7/1965 | Higgins | 99—54 X |
| 3,207,607 | 9/1965 | Migicorsky | 99—54 X |
| 3,271,163 | 9/1966 | Malick | 99—60 |

CARL D. QUARFORTH, *Primary Examiner.*

BENJAMIN R. PADGETT, *Examiner.*

S. J. LECHERT, JR., *Assistant Examiner.*